United States Patent [19]

Syme et al.

[11] Patent Number: 4,927,705
[45] Date of Patent: May 22, 1990

[54] INSULATING LAMINATE

[76] Inventors: Robert W. Syme, 132 Curtis Crescent RR#4, King, Ontario, Canada, LOG 1K0; Michael E. McKenna, 5191 Idlewood Crescent, Burlington, Ontario, Canada, L7L 3Y5

[21] Appl. No.: 229,609

[22] Filed: Aug. 8, 1988

[51] Int. Cl.⁵ .............................................. D04H 1/16
[52] U.S. Cl. ....................................... 428/282; 428/280; 428/285; 428/287; 428/296; 428/457; 428/461; 428/920; 428/192
[58] Field of Search .............. 428/280, 282, 285, 287, 428/296, 457, 461, 920, 192

[56] References Cited

U.S. PATENT DOCUMENTS

| | | | |
|---|---|---|---|
| 3,374,142 | 3/1968 | Kreckl | 161/50 |
| 4,381,716 | 5/1983 | Hastings et al. | 109/2 |
| 4,395,455 | 7/1983 | Frankosky | 428/287 |
| 4,433,019 | 2/1984 | Chumbley | 428/287 |
| 4,535,017 | 8/1985 | Kuckein et al. | 428/77 |
| 4,560,608 | 12/1985 | Pusch et al. | 428/287 |
| 4,637,947 | 1/1987 | Maekawa et al. | 428/287 |
| 4,657,807 | 4/1987 | Fuerstman | 428/263 |
| 4,705,717 | 11/1987 | Cain et al. | 428/287 |
| 4,726,987 | 2/1988 | Trask et al. | 428/282 |
| 4,792,480 | 12/1988 | Freund et al. | 428/296 |

Primary Examiner—James J. Bell
Attorney, Agent, or Firm—Jeffers, Hoffman & Niewyk

[57] ABSTRACT

A flexible insulating laminate including a heat insulating flameproof, soft, resilient and compressible polyester blanket bonded directly at one surface to a polymer surface of a vapor barrier formed by a metallized moisture impermeable, polymer film. The bond is formed by fusion of a heat softened surface of the polymer film and a heat softened surface of the blanket. There is a stiff, high tensile strength bonding layer between the blanket and the barrier. The preferred blanket is composed of heat fused polyester fibres.

9 Claims, 2 Drawing Sheets

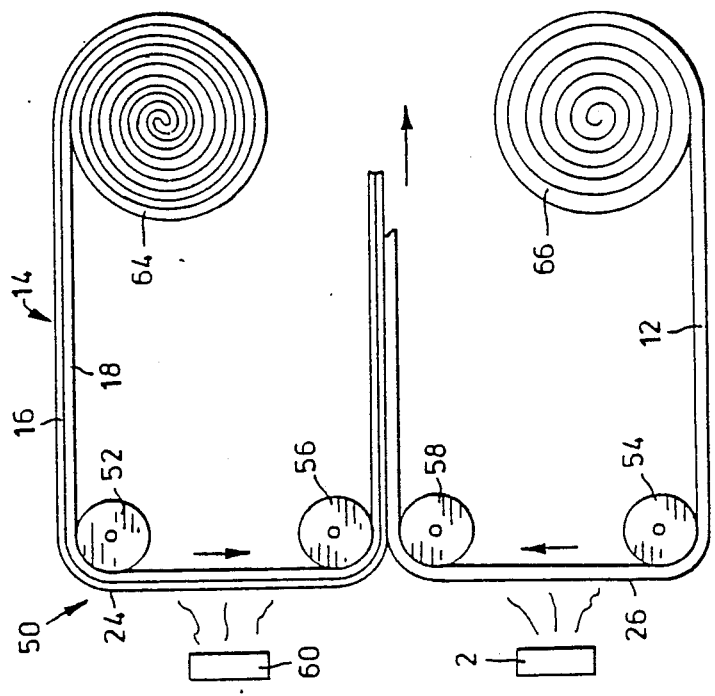
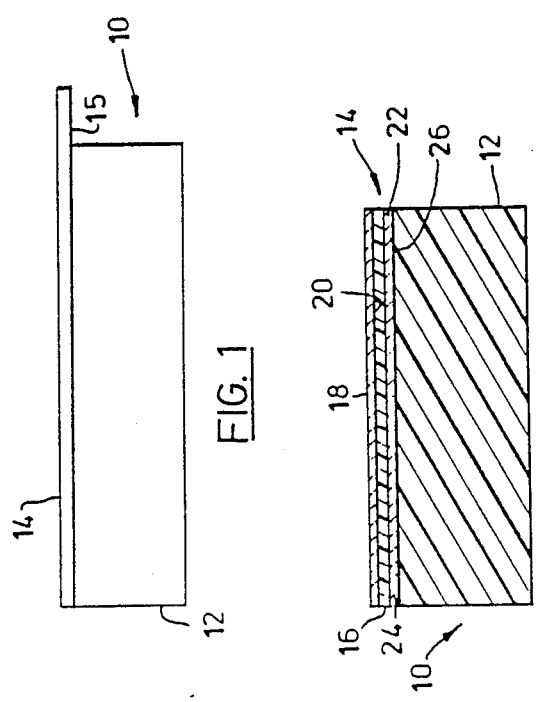

INSULATING LAMINATE

BACKGROUND OF THE INVENTION

This invention relates to a flexible insulating laminate and a method for its manufacture; more especially the invention is concerned with a laminate which is heat insulating, flameproof and forms a sound and vapour barrier.

Various types of insulation are employed for the heat insulation of residential, commercial and industrial buildings. Such insulation is particularly intended to reduce heat loss through the walls and roof of a building during winter and to keep heat outside during summer.

Insulation is rated by a R-value which is a measure of the resistance to heat flow.

Insulation commonly employed is in the form of loose fill, blankets, batts, boards and foam. Loose fill, for example, vermiculite, perlite and rock wool, may be poured into place or may be blown into place, for example, rock wool and cullulose. Blankets and batts, for example, fibreglass batts and blankets and rock wool batts, are fitted and secured in open framing. Boards, for example, polystyrene boards, are attached to exterior surfaces of the building. Foams are contractor installed for example, urethane foam and urea-formaldehyde foam, but the latter is no longer popular.

In winter warm, moist interior air passes through the walls and roof of a building and moisture condenses and accumulates on the cold inner faces of the exterior surfaces of the walls and roof. Eventually it saturates the insulation making it useless and also causes damage to the building structure.

In order to avoid these problems a separate moisture or vapour barrier, for example, polyethylene film or asphalt-coated building paper, is applied over the insulation, with the insulation disposed outwardly of the moisture barrier.

Composite products have also been developed in which a foil or kraft paper vapour barrier is adhered to a blanket or batt of fibre glass insulation. These have the disadvantages that the foil or paper barrier is easily torn or damaged in handling whereafter it does not function as a barrier; difficulty is experienced in forming a strong bond between metal foil and the insulation; and paper has the further disadvantage that it burns readily producing a flame.

The present invention seeks to provide an improved flexible composite insulation in which a tough vapour barrier is securely bonded to a flameproof layer of insulation.

The invention also seeks to provide a method for making such a composite insulation.

SUMMARY OF THE INVENTION

In accordance with one aspect of the invention a flexible, insulating laminate comprises a heat insulating flameproof ply and a vapour barrier ply.

The heat insulating, flameproof ply is a soft, resilient, compressible polyester blanket having an inner face and an outer face. The vapour barrier ply comprises a moisture impermeable polymer film having an inner side and an outer side; the inner side is bonded directly to the inner face of the blanket; and the outer side supports a coating of metal.

In particular the polyester blanket is typically about 1 to 2 inches in thickness and comprises a non-woven polyester felt composed of polyester fibres which are heat fused together. The blanket is preferably free of additives and is non-toxic, non-allergenic and non-irritating to human skin. Most preferably the blanket is composed of substantially pure polyester fibres. The blanket is essentially non-friable in that all the fibres are heat bonded within the blanket and have no tendency to exit or fall from the blanket during handling.

Thus an advantage is that it is not necessary to wear protective clothing, face mask and goggle during installation, as generally recommended for the popular fibreglass batts and blankets.

A still further advantage of polyesters is that they do not produce toxic fumes when burnt.

The polyester fibre blanket is suitably composed of polyester fibres formed from a long chain synthetic polymer composed of an ester of a dihydric alcohol and terephthalic acid, for example, the ester may be a linear poly(ethyleneterephthalate).

The polyester blanket is soft and readily compressed but its resiliency restores it rapidly to its expanded, non-compressed state when the compressive forces are released. Unlike glass fibre batts, the polyester blankets used in the present invention are water repellant.

The vapour barrier is suitably a continuous, polyolefin film, for example, polyethylene or polypropylene, having a thickness of about 1 to 2 mil, metallized on one side. In particular the metal coating may be aluminium applied as a metal dust in a vacuum process. Preferably, the metal coating is continuous. Both the polyolefin film and the metal coating function as vapour barriers, and the metal coating enhances the vapour barrier characteristics of the polymer film by about 200%.

The polymer film of the vapour barrier is bonded directly to the polyester blanket without a separate adhesive.

The flexible, insulating laminate may be provided in a blanket roll form of continuous length, or in batt form, typically 4 to 8 feet in length as for conventional fibreglass insulating batts.

In addition to its heat insulating properties the laminate functions as a sound barrier.

Its characteristics make the laminate suitable for insulating air ducts which are insulated on the inside or outside. The laminate will not break down or separate like insulating batts made of glass fibres. Moreover, even if the present laminate should break down, the polyester fibres that are used are less dangerous than glass fibres.

The laminate has a tough, high tensile strength bond between the polymer film and the polyester blanket; the bond is formed by heating the surfaces of the film and blanket to be bonded to soften the material at the surfaces, and thereafter pressing the softened surfaces together to bond the polymer and polyester. In this way a bonding layer is formed derived from the polymer film and the polyester blanket.

Thus in a further aspect of the invention there is provided a method of forming a flexible, insulating laminate which comprises heat softening the face of a polyester blanket and heat softening a polymer film surface of the vapour barrier, and pressing the film and blanket together at such face and surface to bond the film and blanket together.

In the case of a polyethylene film it is found to be advantageous to heat the surface of the film to just below the melting point of the film.

The invention is further illustrated by reference to the accompanying drawings.

BRIEF DESCRIPTION OF THE DRAWINGS

FIG. 1 illustrates a laminate of the invention;

FIG. 2 illustrates schematically a laminate of the invention in cross-section;

FIG. 3 illustrates schematically a laminate of the invention in a different embodiment;

FIG. 4 illustrates schematically the manufacture of the laminate of FIG. 1; and

DETAILED DESCRIPTION OF PREFERRED EMBODIMENTS

Figure 5:
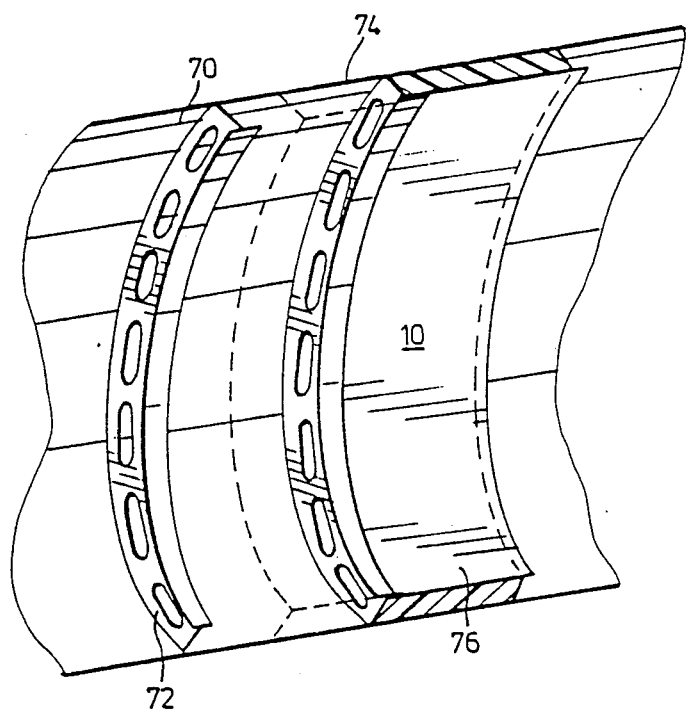
FIG. 5 is a perspective schematic view illustrating the use of the present laminate in an aircraft fusilage.

With further reference to FIG. 1, a heat insulating flameproof laminate 10 of the invention comprises a polyester felt blanket 12 directly bonded to a vapour barrier 14 having a marginal flange 15. Flange 15 can be employed as an attachment strip for firmly securing the laminate 10 to for example, an attic roof, by staples, nails or other attaching elements. A second laminate 10 is then fitted to overlap flange 15 and form a continuous layer of insulation.

A preferred form of polyester blanket 12 is that sold by Eastman Kodak under the name A B polyester fiber, which material contains a mixture of two fibres having different melt points. The first fibre is a low melt fibre having a binding point of 149 degrees C. or about 300 degrees F. The second fibre is a high melt fibre having a softening point which is about 480 degrees F. Only the low melt fibre is heat softened by the aforementioned heating step in the manufacturing process.

With further reference to FIG. 2, vapour barrier 14 comprises a moisture impermeable polyethylene film 16 having a thickness of about 1.5 mil with a continuous metal coating 18 on an outer side 20 of film 16.

A tough high tensile strength bonding layer 22 between blanket 12 and barrier 14 is formed by adhering an inner side 24 of the film 16 to an inner surface 26 of the blanket 12.

With further reference to FIG. 3 a heat insulating, flameproof laminate 110 comprises a polyester blanket 112 and a pair of vapour barriers 114. Each vapour barrier 114 comprises a moisture impermeable polyethylene film 116 with a continuous metal coating 118. The bonding of the film 116 to the blanket 112 is as described for the embodiment of FIG. 2.

The laminate 110 is suitable as a non-flammable, insulated blanket for location in a scaffold framework to form a temporary protected environment for construction work during winter.

With further reference to FIG. 4, a line 50 for producing a laminate 10 of FIG. 2 comprises feed rolls 52 and 54, pressure rolls 56 and 58 and radiant heaters 60 and 62.

A continuous sheet of vapour barrier 14 is fed from a source roll 64 over heated roll 52 and past radiant heater 60. Side 24 of polyethylene film 16 of barrier 14 faces heater 60.

A continuous sheet of polyester blanket 12 is fed from a roll blanket 66 over heated roll 54 and past radiant heater 62 with surface 26 of blanket 12 facing heater 62.

The side 24 of film 16 is heated to a softened state by radiant heater 60, and the surface 26 of blanket 12 is heat softened by radiant heater 62.

Blanket 12 and barrier 14 are pressed together with the softened side 24 and softened surface 26 in contact, between rolls 56 and 58. The softened polyethylene and polyester intermingle and fuse together as the polyethylene and polyester harden on cooling.

EXAMPLE 1

Employing line 50 of FIG. 4, rolls 52, 54, 56 and 58 are heated internally by hot water to 51 degrees C. and are maintained at such temperature. The radiant heaters 60 and 62 are controlled to a heating temperature of about 193 degrees C. (380 degrees F). The polyester blanket 12 has a non-compressed thickness of 1.25 inches.

Vapour barrier 14 comprises a polyethylene film 16 having thickness of about 1.5 mil and a melting temperature of about 138 degrees C., metallized on outer size 20 with aluminum.

A laminate 10 was produced as described with reference to FIG. 4; the laminate 10 displayed superior heat and sound insulating characteristics; no separate vapour barrier was required. A tough high tensile strength bond was formed between the blanket 12 and the barrier 14; attempts to separate the barrier 14 from the blanket 12 by opposed pulling forces resulted in separation of fibre layers within blanket 12, thus the bond between blanket 12 and barrier 14 is stronger than the internal bonding of the fibres of the felt blanket 12.

FIG. 5 illustrates the use of the present laminate 10 in a heat insulated structure, in this case an aircraft fusilage 70 (shown only in part). The laminate 10 is positioned between the struts or ribs 72 that form part of the fusilage. The metallized moisture barrier 14 is placed against the skin 74 of the fusilage, permitting condensation forming on the inside surface of the skin to run off. An optional metallized moisture barrier 76 can he used on the inside surface of the laminate if desired, for a low Hertz barrier. The edges of the laminate can be butt joined and adhered to the struts with an adhesive. The present laminate can be custom designed and prefabricated for ease of installation.

The laminate 10 of the invention can be attached to ductwork or other metal surfaces by known Clip-Pins sold by Duro Dyne National Corp. of Farmingdale, N.Y. These fasteners are resistance welded to the duct or metal surface by a special known welding process. Another possible fastener for the laminate 10 is a self adhesive hanger or an adhesive type hanger sold under the trademark DYNASTICK by the aforementioned Duro Dyne National Corp.

The present laminate is believed by the applicant to have many valuable commercial uses including the insulation of air make-up systems in buildings and the insulation of transportation vehicles such as train cars, subway cars, and aircraft.

The present laminate product was subjected to certain standard tests by the Ontario Research Foundation to determine its suitability for use in buildings and vehicles such as aircraft. The first test was conducted in accordance with procedure described in "Standard Method of Test for Surface Burning Characteristics of Flooring, Floor Covering and Miscellaneous Materials" Can/ULC-S102.2-M83. This test procedure was intended to determine the relative surface burning characteristics of materials under specific test conditions. The results are expressed in terms of flame spread classification (FSC), smoke developed (SD) and fuel contribution (FC), compared to asbestos cement board (designated as 0) and red oak (designated as 100).

Prior to this test, the sample product was conditioned to constant mass at a temperature of 23 degrees C. and a relative humidity of 50 per cent. The tunnel for the test is preheated to 85 degrees C. as measured by a thermocouple embedded in the backwall located 7090 mm downstream of the burner ports and allowed to cool to 40 degrees C. as measured by thermocouple embedded in the backwall 4000 mm from the burners. At this time the test sample is placed along the floor of the tunnel so as to form a continuous surface and the lid of the tunnel is lowered in place.

Upon ignition of the gas burners, the flame spread distance is observed and recorded every 15 seconds. Flame spread distance versus time is plotted ignoring any flame front recessions. If the area under the curve (A) is less than or equal to 29.7 mO.min, FSCl=1.85 A; if greater, FSCl=1640/(59.4-A). Smoke developed and fuel contribution are determined by comparing the area under the obscuration curve and the temperature curve for the test sample to that of red oak (designated 100) and asbestos cement board (designated 0).

| | TEST RESULTS | | |
|---|---|---|---|
| SAMPLE | FSC1 | SD | FC |
| Commercial Liner | 16 | 30 | 5 |

At an FSC1/SD of 16/30, the product of the invention as tested falls within the preferred, low-index category of 25/50 (with reference to the Building Codes of Canada).

The product of the invention was also tested by the Ontario Research Foundation to determine smoke generation according to test procedure ASTN E 662 and toxic gas generation according to Boeing test BSS 7239. In each case the plastic-face surface of the product was tested. The results of the first of these tests were as follows:

| | ASTM E 662 (NFPA 258): Specific Optical Density of Smoke Generated by Solid Materials | | | | | | | |
|---|---|---|---|---|---|---|---|---|
| | Flaming Mode | | | | Non-Flaming Mode | | | |
| Trial | Ds 1.5 | Ds 4.0 | Dm | Dm (Corr) | Ds 1.5 | Ds 4.0 | Dm | Dm (Corr) |
| 1: | 11 | 20 | 92 | 85 | 0 | 1 | 47 | 45 |
| 2: | 4 | 10 | 36 | 32 | 1 | 2 | 24 | 23 |
| 3: | 4 | 15 | 69 | 65 | 1 | 2 | 37 | 36 |
| Average: | 6 | 15 | 66 | 61 | 1 | 2 | 36 | 35 |
| Specified Max: (AC 3135-00-003 para. 4.14) | — | 100 | — | — | — | 100 | — | — |
| Standard Deviation: | | 5 | | 27 | | 1 | | 11 |

The results of the Boeing BSS 7239 test were as follows:

| | Flaming Mode | Non-Flaming Mode | Specified in Section 4.15 of AC 3135-00-003 |
|---|---|---|---|
| Carbon Monoxide (CO ppm) | | | |
| at 1.5 min | 25 | 5 | — |
| at 4.0 min | 70 | 9 | — |
| at max. | 295 | 40 | 3500 |
| Hydrogen Cyan (HCN ppm) | 1 | 1 | 150 |
| Hydrogen Chloride (HCl ppm) | 26 | 12 | 500 |
| Hydrogen Fluoride (HF ppm) | 1 | 1 | 50 |
| Hydrogen Bromide (HBr ppm) | 1 | 1 | — |
| Sulphur Dioxide (SO2 ppm) | 1 | 1 | 100 |
| Nitrogen Oxides (as NO2 ppm) | 1 | 1 | 100 |
| Phosgene (COCl2 ppm) | 1 | 1 | — |
| Original Wt. (g) | 3.20 | 2.69 | — |
| Final Wt. (g) | Not determinable | — | — |
| Wt. Loss (g) | — | — | — |
| Wt. Loss (%) | — | — | — |
| Time to Ignition (s) | 1 | Did not ignite | — |
| Burning Duration (s) | 19 | — | — |

The results of these two tests indicate that the tested sample of the invention met Air Canada Specification 3135-00-003, section 4.14 Smoke Generation (ASTM E 662) and section 4.15, Toxic Gas Generation, specifications as well as Bombardier requirements for rail cars and rail vehicles for smoke emission and toxic gas generation.

Various modifications and changes to the laminate product as described will be apparent to those skilled in this art. Accordingly all such modifications and changes as falls within the scope of the appended claims are intended to be part of this invention.

I therefore claim:

1. A flexible, insulating laminate comprising:
   heat insulating, flameproof ply of a soft, resilient, compressible polyester blanket having an inner face and an outer face, and
   a vapour barrier ply comprising a moisture impermeable polymer film having an inner side and an outer side, said inner side being bonded directly to said inner face of said blanket by a bonding layer and said outer side supporting a coating of metal.

2. A laminate according to claim 1, wherein said bonding layer is stiff, derived from said polymer film and said blanket, and has high tensile strength.

3. A laminate according to claim 1 wherein said blanket is a polyester felt composed of heat fused polyester fibres.

4. A laminate according to claim 1 wherein said polymer film is a polyolefin film.

5. A laminate according to claim 1 wherein said blanket is a non-woven polyester felt composed of heat fused fibres and said vapour barrier ply comprises a polyethylene film metallized with aluminium.

6. A laminate according to claim 2, wherein said bonding layer is formed by heating said inner side of said polymer film to form a first outer, heat softened layer, heating said inner face of said blanket to form a second outer, heat softened layer and fusing said blanket and film together at said first and second layers.

7. A laminate according to claim 1 wherein said vapour barrier ply has a marginal edge extending beyond an adjacent edge of the flameproof ply.

8. A laminate according to claim 1 including a second vapour barrier ply comprising a moisture impermeable polymer film having an inner side and an outer side, said inner side being bonded directly to said outer face of said blanket by a bonding layer, said outer side of said film of said second ply supporting a coating of metal.

9. A heat insulated structure wherein the insulation is a flexible laminate as defined in claim 1.

* * * * *